United States Patent [19]

Kostecki

[11] Patent Number: 4,514,443
[45] Date of Patent: Apr. 30, 1985

[54] COATING INTERNAL SURFACES OF CURVED CONDUITS

[76] Inventor: Gene Kostecki, 40 Bramwell Rd., Noranda, Australia

[21] Appl. No.: 537,456

[22] PCT Filed: Dec. 30, 1982

[86] PCT No.: PCT/AU82/00224
§ 371 Date: Sep. 8, 1983
§ 102(e) Date: Sep. 8, 1983

[87] PCT Pub. No.: WO83/02573
PCT Pub. Date: Aug. 4, 1983

[30] Foreign Application Priority Data

Jan. 29, 1982 [AU] Australia ............... PF2503
Sep. 22, 1982 [AU] Australia ............... PF6007
Sep. 22, 1982 [AU] Australia ............... PF6008

[51] Int. Cl.$^3$ ............... B05D 7/22; B05C 7/00
[52] U.S. Cl. ............... 427/230; 427/236; 427/239; 118/704; 118/705; 118/706; 118/215; 118/242; 118/254; 118/317; 118/323; 118/408; 118/DIG. 10; 219/61; 219/76.14
[58] Field of Search ............... 118/705, 706, 214, 215, 118/254, 306, 317, DIG. 10, 323, 408, 242, 704; 427/181, 230, 236, 239, 286; 266/58, 73; 219/59.1, 60 R, 61, 76.14, 76.12

[56] References Cited

U.S. PATENT DOCUMENTS

| | | | |
|---|---|---|---|
| 2,002,701 | 5/1935 | McWane | 427/234 |
| 2,295,702 | 9/1942 | Wissler | 427/225 |
| 2,461,517 | 2/1949 | Carnevale | 118/306 |
| 2,818,083 | 12/1957 | Jelm | 138/145 |
| 3,180,312 | 4/1965 | Handley et al. | 118/302 |
| 3,606,862 | 9/1971 | Huff et al. | 118/306 |
| 3,818,862 | 6/1974 | O'Brien et al. | 118/306 |
| 4,165,245 | 8/1979 | Ludwig | 148/127 |
| 4,253,006 | 2/1981 | Ludwig | 219/76.1 |
| 4,343,436 | 8/1982 | Lehmann | 239/696 |

Primary Examiner—Norman Morgenstern
Assistant Examiner—Ken Jaconetty
Attorney, Agent, or Firm—Nilsson, Robbins, Dalgarn, Berliner, Carson & Wurst

[57] ABSTRACT

Apparatus for coating an internal wall of a curved conduit (50) with a layer of protective material, characterized in that it comprises a guide means (46, 46a), a longitudinally flexible member (44) which is transversely substantially rigid associated with the guide means, means for mounting a coating means (62) adjacent a first end of the flexible member for incremental rotation with the flexible member, a drive means (28) for driving the flexible member relative to a curved conduit (50) to be coated, so that the coating means can enter the curved conduit in use and so that the coating means can deposit a strip of protective material longitudinally of the conduit, and means (32, 34, 36) acting on the flexible member for automatically stepping the flexible member and consequently the coating means by a rotational increment after the coating means has completed a traverse of the conduit and for automatically reversing the drive means so that the apparatus deposits a strip of protective material adjacent the first laid strip.

20 Claims, 10 Drawing Figures

COATING INTERNAL SURFACES OF CURVED CONDUITS

DESCRIPTION

The present invention relates to apparatus for coating internal surfaces of curved conduits.

FIELD OF THE INVENTION

Flow of fluid through a pipe or conduit such as flow of gas or liquid through a pipeline, encounters wall friction. To minimize this there is a tendency to use as large a bore as possible and changes in direction are avoided as much as possible. However, some bends in a conduit system are unavoidable.

In passing through bends not only is the direction of flow changed but complex whirl patterns can be set up which increases friction exerted on the internal walls of the conduits.

Further, liquids are frequently used for transporting suspended particles and/or to take away unwanted materials that are drawn through the carrier liquid. The liquid borne materials may themselves be extremely abrasive and cause much damage in contact with internal walls. Thus, curved or bent sections of pipes or conduits may be under considerable stress and are subject to significantly more wear than straight sections.

It follows that curved or bent sections need to be provided with a protective inner coating such as a hard protective coating. Hard protective coating is known for other purposes and is called hard facing. Hard facing may be applied by various techniques such as welding, spraying or by plasma.

SUMMARY OF THE INVENTION

In accordance with the present invention there is provided an apparatus for coating an internal wall of a curved conduit with a layer of protective material, characterised in that it comprises a guide means, a longitudinally flexible member which is transversely substantially rigid associated with the guide means, means for mounting a coating means adjacent a first end of the flexible member for incremental rotation with the flexible member, a drive means for driving the flexible member relative to a curved conduit to be coated, so that the coating means can enter the curved conduit in use and so that the coating means can deposit a strip of protective material longitudinally of the conduit, and means acting on the flexible member for automatically stepping the flexible member and consequently the coating means by a rotational increment after the coating means has completed a traverse of the conduit and for automatically reversing the drive means so that the apparatus deposits a strip of protective material adjacent the first laid protective strip.

In accordance with the present invention there is provided a method of coating an interal wall of a curved conduit which comprises inserting a curved guide means in the conduit which guide means extends substantially axially of the conduit, said guide means having a longitudinally flexible member in association with it so as to cause the flexible member to be longitudinally guided by the guide means, connecting a coating member adjacent one end of said flexible member, providing drive means for moving said flexible member and thus said coating means relative to and longitudinally of said conduit, causing the coating means to deposit a layer of protective material in a strip extending longitudinally of said conduit, and then rotationally incrementally stepping the flexible member, and the coating means to an adjacent position and reversing the drive means so as to cause the coating means to deposit a further strip of protective material adjacent the first coated strip.

The present invention is particularly concerned with applying substances which protect curved conduits against abrasion or corrosion alloy facing on curved conduits but it is to be understood that it is general applicability in that this coating can take other forms. For example, the coating could be an organic protective material.

By coating longitudinal strips of protective material in side by side relationship around the curve of the conduit, the coating strips run in the same general direction as the fluid running through the conduit in use. Thus, not only is the conduit protected by a protective coating but the coating promotes a smooth lamina flow.

BRIEF DESCRIPTION OF THE DRAWINGS

The present invention will now be described, by way of example, with reference to the accompanying drawings, in which.

DESCRIPTION OF THE INVENTION

Figure 1:
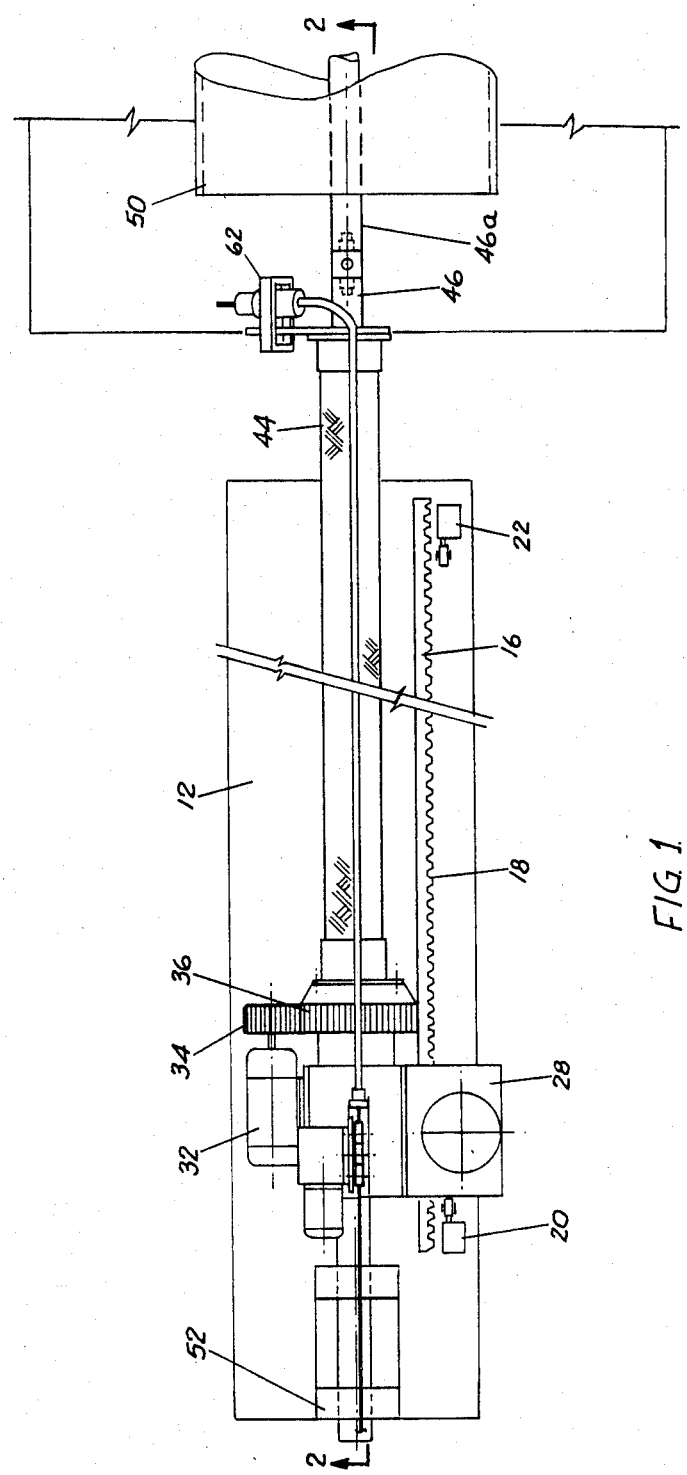
FIG. 1 is a plan view of part of one embodiment of an apparatus for coating curved conduits in accordance with the present invention.

In FIGS. 1 to 4, there is shown an apparatus for internally coating the interior walls of curved conduits, which apparatus comprises a support 10 having a flat upper surface 12. Mounted on the surface 12 is a linear, triangular section guide rail 14. A rack 16 is also mounted on the surface 12 parallel to but spaced from the bar 14. The rack 16 has a toothed outer side 18 remote from the rail 14. Adjacent each end of the rack 16 an adjustable switch 20 and 22 is mounted on the surface 12. As can be seen in FIG. 1 each switch 20 and 22 is mounted adjacent to the toothed side 18 of the rack 16.

Figure 2:
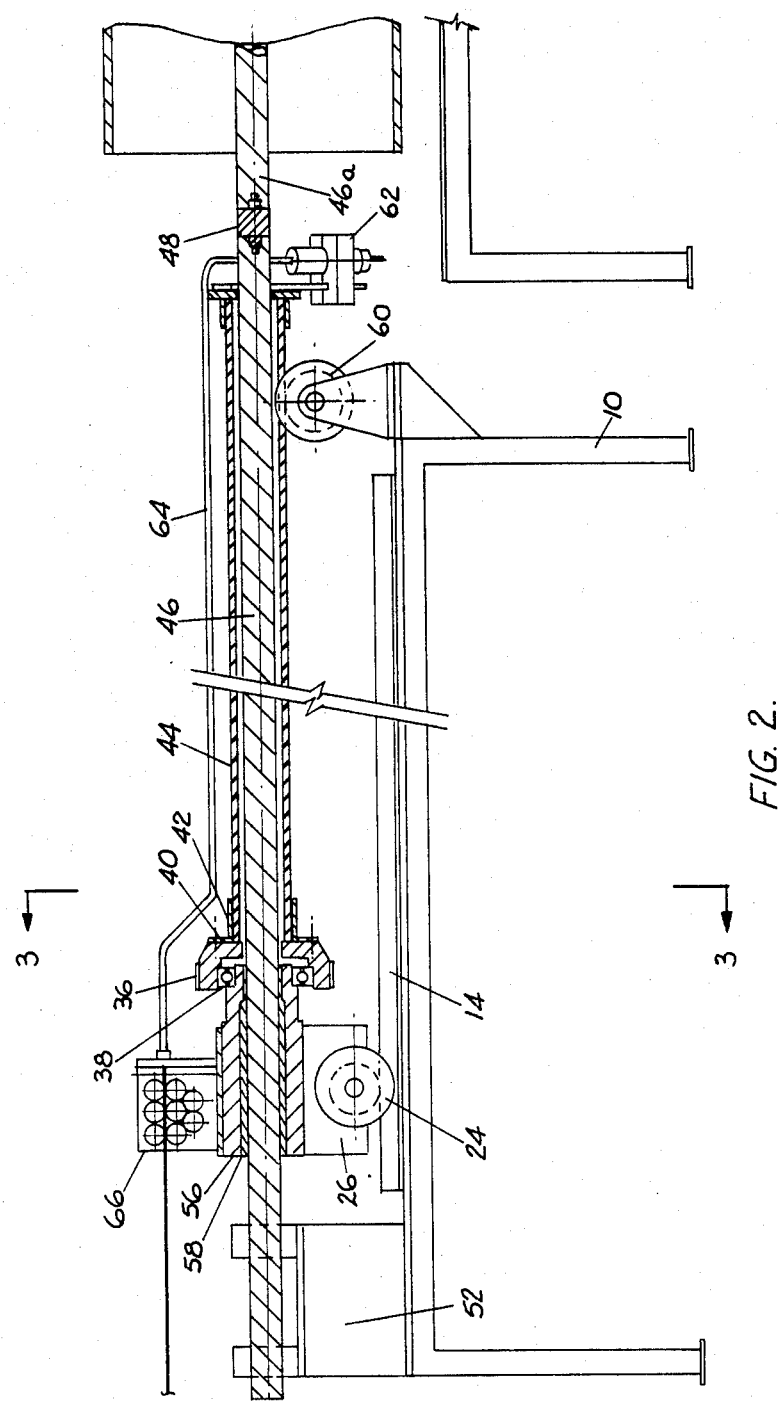
FIG. 2 is a longitudinal section along the line 2—2 of FIG. 1.
Figure 3:
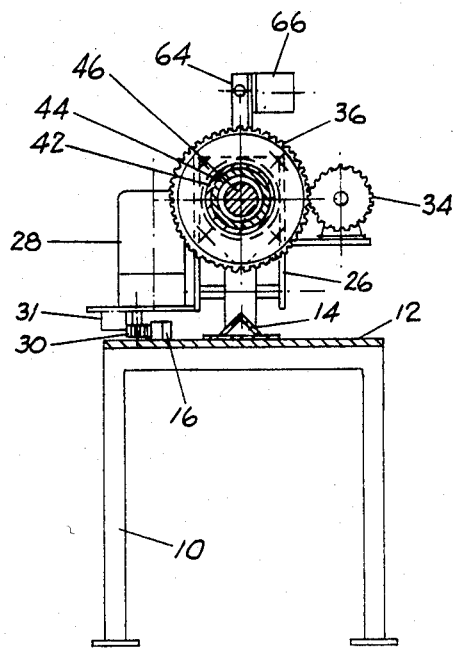
FIG. 3 is a transverse section along the line 3—3 of FIG. 2.

A wheel 24 with a V-section rim rides on the rail 14. The wheel 14 is connected by an axle to a moveable frame 26. The frame 26 provides on one side a mounting for a drive motor 28 including a gear box. The drive motor 28 has a downwardly depending shaft having rigidly mounted thereon a pinion 30. The pinion 30 meshes with the toothed face 18 as can be seen in FIG. 3. A block 31 depends from the frame 26 for contact with the switches 20 and 22. The frame 26 also provides a mounting for a stepper motor 32 including a gear box having an output shaft with a pinion 34 rigidly attached thereto. The pinion 34 meshes with a crown wheel 36. As can be seen in FIG. 2, the crown wheel 36 is rotatably mounted on a roller bearing 38. Further, the crown wheel 36 is rigidly attached such as by welding or bolting to a flange 40 of a collar 42. The collar 42 has a cylindrical portion which is welded to a tube 44. The tube 44 is longitudinally flexible but relatively rigid transversely and it may be formed from flexible hydraulic hose. Thus, if one end of the tube 44 is rotated the rotary motion is transmitted to the entire length of the tube 44 so that the far end rotates in equivalent manner to the end adjacent the collar 42.

Figure 4:
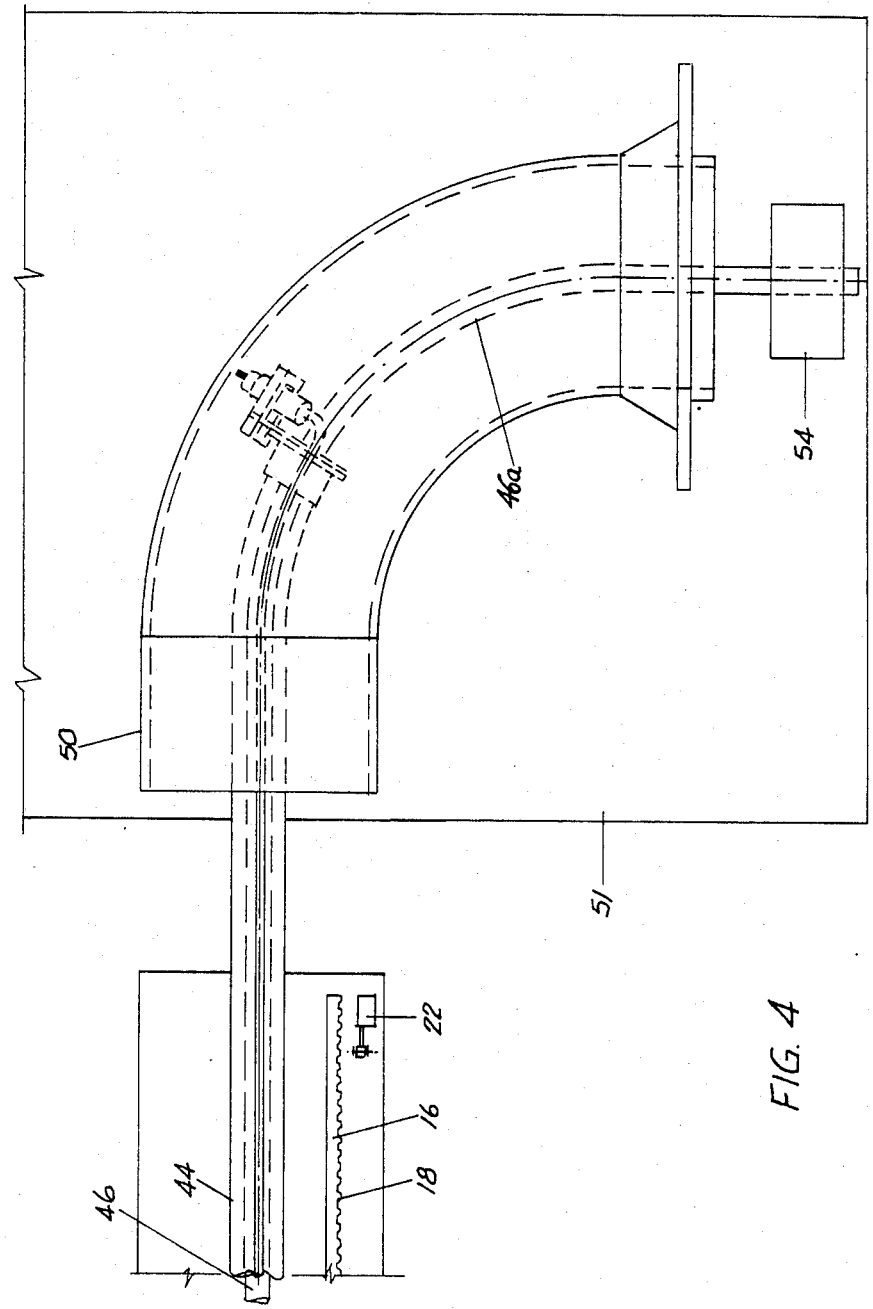
FIG. 4 is a plan view of the remainder of the embodiment of FIG. 1.

The tube 44 is mounted about a guide shaft 46. In the position shown in FIG. 2, the portion of the guide shaft 46 about which the tube 44 is mounted is linear. The linear portion of the guide shaft 46 is coupled to a curved portion 46a by a suitable connector 48 having, for example, ends with oppositely handed threads. As can be seen in FIG. 4, the curved section 46a, in use, extends axially through a curved conduit 50 mounted on a surface 51. The end of the shaft 46a remote from the connector 48 is supported on a saddle 52 mounted on the surface 12. The end of the shaft 46a remote from the connector 48 is supported on a saddle 54 mounted on the surface 51.

Further, the roller bearing 38 is secured to a sliding saddle 56 mounted about the shaft 46. The saddle 56 is mounted on a slidably mounted annular bearing 58 mounted for movement with the saddle 56.

Figure 5:
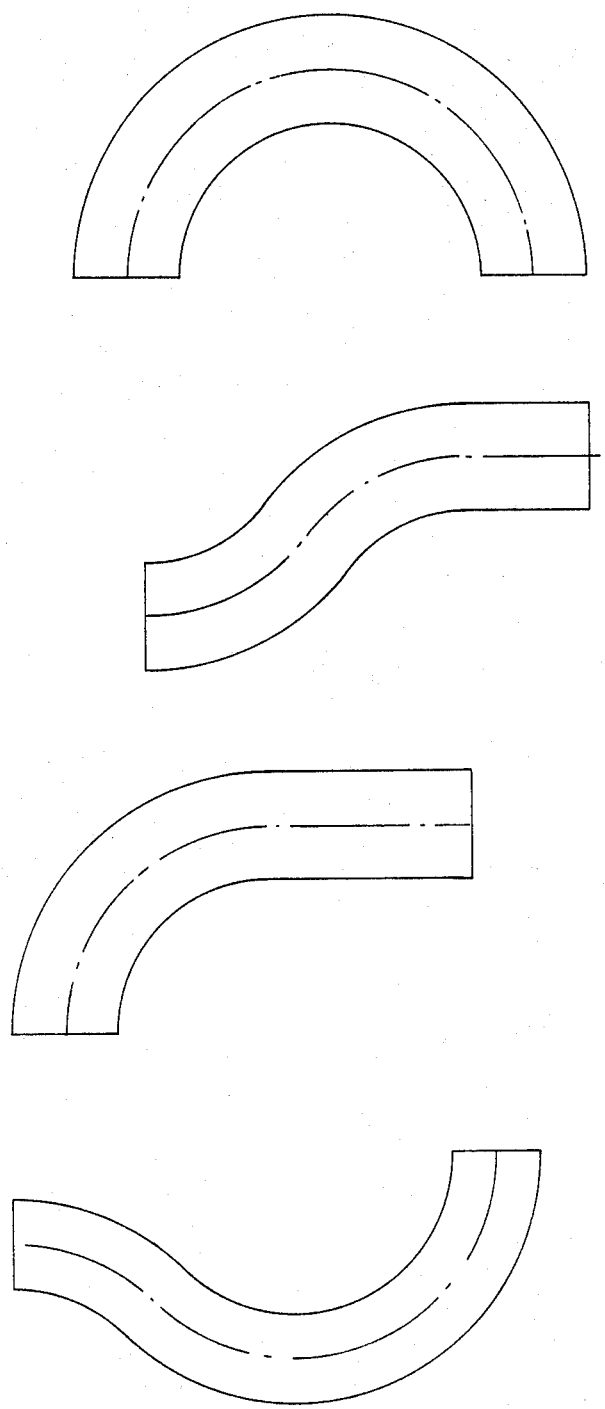
FIG. 5 shows various curved conduit configurations which can be internally coated by the apparatus of FIGS. 1 to 4.

Still further, the leading end of the tube 44 as seen in FIG. 2, is supported by a wheel 60 rotatably mounted on the support framework 10. A welding head 62 is attached to the leading end of the tube 44. A flexible welding wire feed conduit 64 extends from a wire feed device 66 of known type to the welding head 62. The feed conduit 64 is clamped to the flexible tube 44 by any suitable means so that the conduits 44 and 64 turn together in use. In use, a shaft 46a is mounted in a curved conduit such as one of those shown in FIG. 5. It can be seen that the conduits shown in FIG. 5 may comprise straight portions as well as curved portions. Also, the apparatus of the invention may coat the entire inner wall of the curved conduit or only part thereof. The shaft 46 extends axially of the conduit so that it is substantially equispaced from the interior thereof throughout its length.

The shaft 46a is connected to the leading end of the shaft 46 by means of the connector 48. The connector 48 comprises one end with a thread of a first hand and another end with a thread of opposite hand so that the shafts 46 and 46a are threadedly connected together. Initially, the apparatus is in the position shown in FIGS. 1 to 3. To commence operation, the drive motor 28 is energised so as to drive the tube 44 from left to right as seen in FIG. 2. The welding head 62 is positioned throughout its travel so as to be a suitable distance from an internal wall of the conduit 50 shown in FIG. 4. The tube 44 is driven by rotation of the pinion 30 in engagement with the rack 18. This action pulls the frame 26 so that the wheel 24 travels on the rail 14. Further, the saddle 56 slides on the shaft 46 by means of the bearing 58.

When the welding head 62 enters the conduit 50 the welding head 52 is energised in known manner so as to deposit melted alloy weld material such as hard face weld material on this internal wall of the conduit 50. The melted alloy material solidifies in a longitudinally extending strip on the internal wall of the conduit.

The strip may extend from one end of the conduit 50 to the other or it may extend only part of the way through the conduit 50 depending on the position of the switches 20 and 22. Further, as the welding head 62 reaches the bend in the shaft 46a the tube 44 merely bends to conform to the curve as shown in FIG. 4. The limit switch 22 is arranged so that as the welding head 62 reaches the far end of the region of the conduit 50 to be coated, the switch 22 is contacted. This does two things.

Firstly, the stepping motor 32 receives a signal to step slightly and thus rotate the pinion 34 slightly by an increment. This action causes the crown wheel 36 to rotate slightly on the ball race 38, and the tube 44 to be rotated by an equivalent amount. The tube 44 is substantially rigid transversely of its length and thus the entire tube 44 rotates by the same amount. Therefore, the welding head 62 is rotated by the same amount.

Secondly, the drive motor 28 receives a signal which causes it to reverse direction of drive. Thus, the welding head 62 is brought back to the initial end of the conduit 50 and so doing deposits another strip of hard face material adjacent the first laid strip. When the welding head reaches again the initial end of its travel through the conduit 50, the switch 20 is contacted and once again the welding hand 62 is stepped by a small rotational increment and the drive motor 28 reverses its direction of drive. The process is then repeated continually and automatically until the entire inner wall of the conduit to be coated has been alloy faced by adjacent strips of alloy face material running from end to end of the conduit 50.

During operation the wire feeder 66 feeds wire continually through the conduit 64 to the welding head 62 in known manner. The welding head 62 could be readily replaced by equivalent apparatus such as a alloy spray head or a plasma head.

Figure 6:
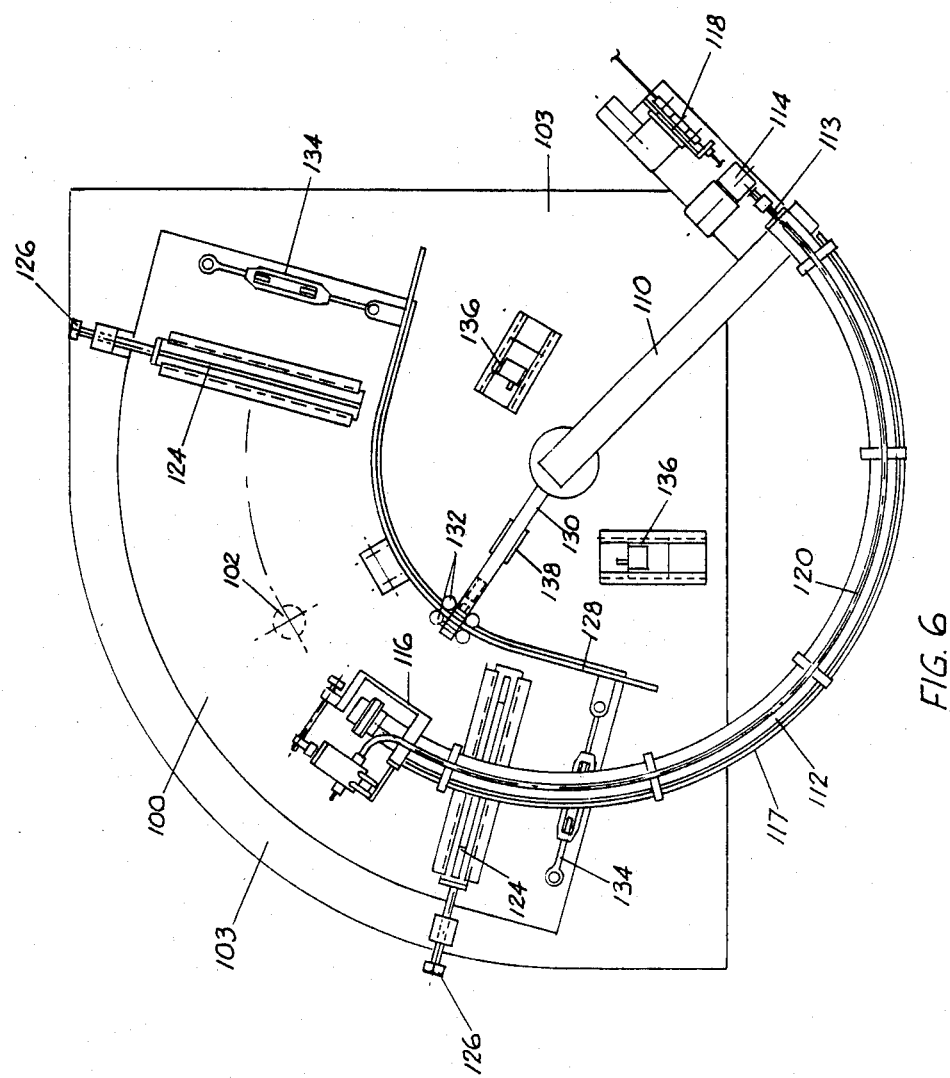
FIG. 6 is a plan view of another embodiment of an apparatus for coating curved conduits in accordance with the present invention.
Figure 7:
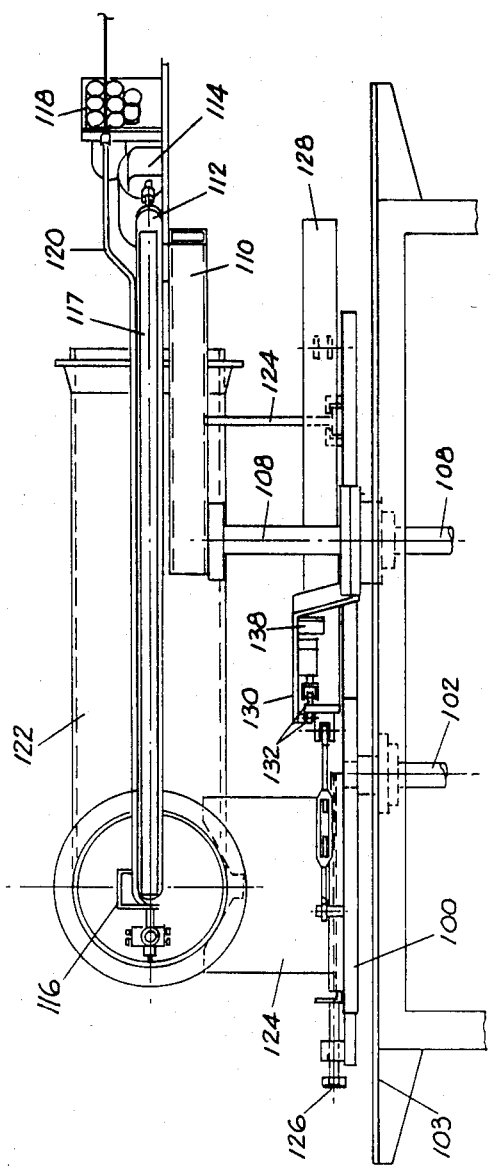
FIG. 7 is a side elevation of an upper part of the apparatus of FIG. 6.
Figure 8:
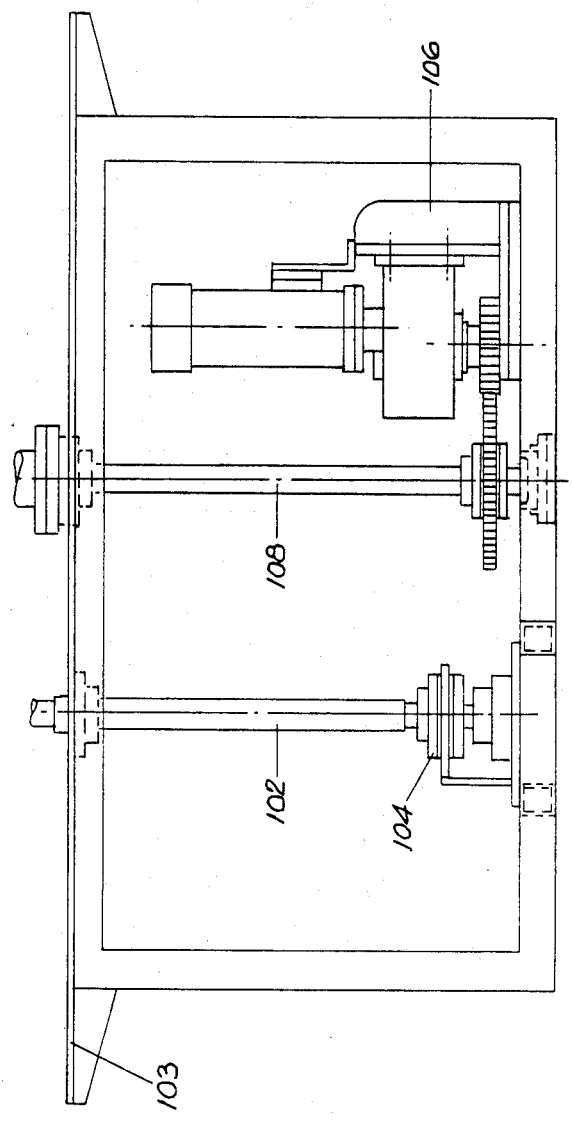
FIG. 8 is a side elevation of a lower part of the apparatus of FIG. 6.

In FIGS. 6 to 8, there is shown another embodiment of an apparatus for coating curved conduits in accordance with the present invention. This apparatus comprises an arcuate cradle 100 pivotally mounted on a rotatable vertical shaft 102 which extends through an upper surface of a table 103. The shaft 102 is axially rotatable and is arranged to move with the cradle 100 when the latter pivots. To damp movement of the shaft 102 it is fitted with an adjustable friction clutch 104 adjacent its lower end. Below the level of the table 103 there is provided a drive motor 106. The drive motor 106 is drivingly connected to a second rotatable vertical shaft 108 by means of gears. The shaft 108 also extends upwardly through the table 103 and is connected at its upper end to a radial arm 110.

At its other end the arm 110 is connected to an arcuate rigid, hollow welding arm 112. The welding arm 112 contains a flexible cable 113 most of which cannot be seen. The flexible cable 113 runs the entire length of the welding arm 112. Adjacent the radial arm 110 the flexible cable 113 is connected to a stepper motor 114.

At the end of the welding arm remote from the arcuate arm 112, the flexible cable 113 is operatively connected to a gear box which is connected to a welding head 116. A bus bar is connected to the welding arm 112 to conduct electricity to the welding head 116. Further, the apparatus comprises a wire feeder 118 arranged to feed wire through a conduit 120 which is attached to the arcuate arm 112. The cradle 100 is arranged, in use, to have a curved conduit such as a pipe bend resting on it as shown by the 90° pipe bend 122 shown in FIG. 7.

The cradle 100 comprises a pair of saddles 124 each of which comprises a screw adjuster 126. The screw adjusters 126 enable the saddles 124 to be moved laterally slightly to accommodate slight variations in the shape of pipe bends 122. Further, a guide rail 128 is attached to the cradle 100 and runs along its inner side. As will be described ends of the rail 128 may be moved slightly by use of adjustment means. The pipe bends 122 usually have straight lead in portions at either end and it is then necessary to adjust the relative positions of the cradle 100 and the table 103 during operation to enable the arcuate arm 112 to coat all of the parts of the pipe bend 122 which it is desired to coat. Thus, the rail 128 has straight portions at each of its ends. Further, a guide arm 130 is arranged for movement with the shaft 108 and extends away from the radial arm 110. The guide arm 130 has adjacent its outer end two pairs of guide wheels 132 which sandwich between the pipe the guide rail 138. Thus, there is, in use, an interaction between the movement of the arcuate arm 112 and the cradle 100.

The positions of the ends of the guide rail 128 can be adjusted to account for minor variations in pipe bends 132 by adjusting the turn handles 134 extending between the cradle 100 and the ends of the guide rail 128.

Further, the table 103 has mounted thereon switches 136. The switches 136 are mounted in mounts which enable their position to be varied to some extent.

Further, there is a downwardly depending lug 138 on the guide arm 130 arranged to contact the switches 136. In use, a pipe bend 122 is placed on the saddles 124 and the positions of the saddles adjusted, if necessary, by the screw adjusters 126 to enable them to support the pipe bend 122 adequately.

Then, the motor 106 is energised to cause the shaft 108 (FIG. 7) to rotate (at this time the weld head 116 is not in operation). This causes the vertical arm 110 (FIG. 6) to pivot on the shaft 108 and thus the arm 112 traverses an arc. The welding head 116 enters the pipe bend 122 (FIG. 7). However, because of the straight lead in to the pipe bend 122 it is necessary for the guide arm 130 (FIG. 6) to interact via the wheels 132 with the track 128 and to cause the cradle 100 to pivot slightly on the shaft 102 as the radial arm 110 pivots with rotation of the shaft 108.

Thus, the position of the pipe bend 122 is automatically changed to compensate for the straight lead in parts. The operator can ascertain whether the weld head is spaced at the desired distance from the inner wall of the pipe head at all positions. If not, the positions of the ends of the guide rail 128 can be varied by adjusting the turn handles 134. There is also a fine, in use adjustment means at the weld head 116 which will be described subsequently. If the distance of the weld head 116 from the inner wall of the pipe bend 112 is satisfactory, the weld head 116 can be energised as it commences a pass through the pipe bend 122. This causes a longitudinal strip of alloy face material to be deposited on the inner wall of the pipe bend 122 in similar manner to the embodiment of FIGS. 1 to 4. When the weld head reaches the end of its intended travel through the pipe bend 122 the lug 132 contacts a switch 136. This sends a signal which causes the stepping motor 114 to rotate the flexible drive 113 by an increment and thus rotate the weld head 116 by a corresponding rotational increment. Further, a signal also causes the drive of the motor 106 to be reversed so that the weld head can deposit a longitudinal step of alloy face material adjacent the first laid strip in similar manner to the embodiment of FIGS. 1 to 4.

This process continues automatically until the entire area of the inner wall which is to be alloy faced is completely covered with alloy face material.

The wire feeder 118 continually feeds weld wire to the weld head 116 through the conduit 120 in known manner.

Figure 9:
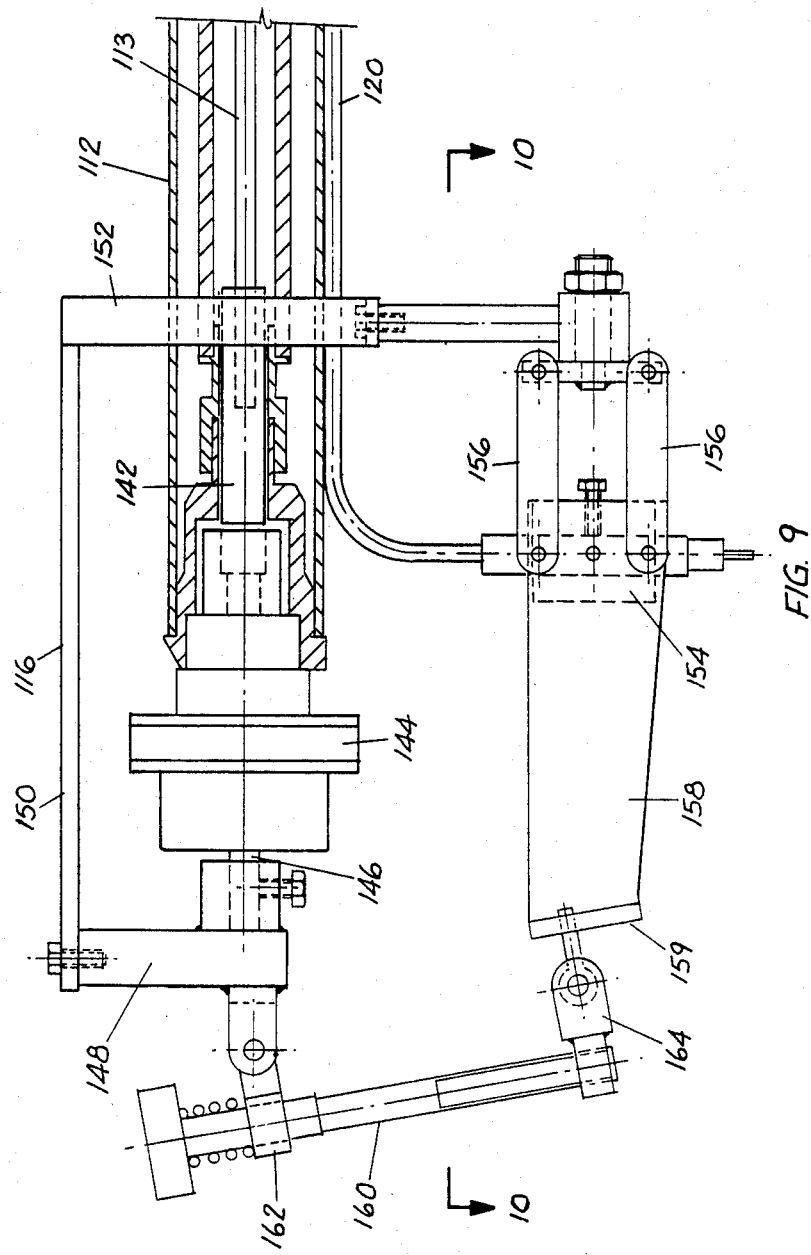
FIG. 9 is a plan view of a part of the apparatus of FIG. 6 showing a detail for adjusting the position of a welding torch.
Figure 10:
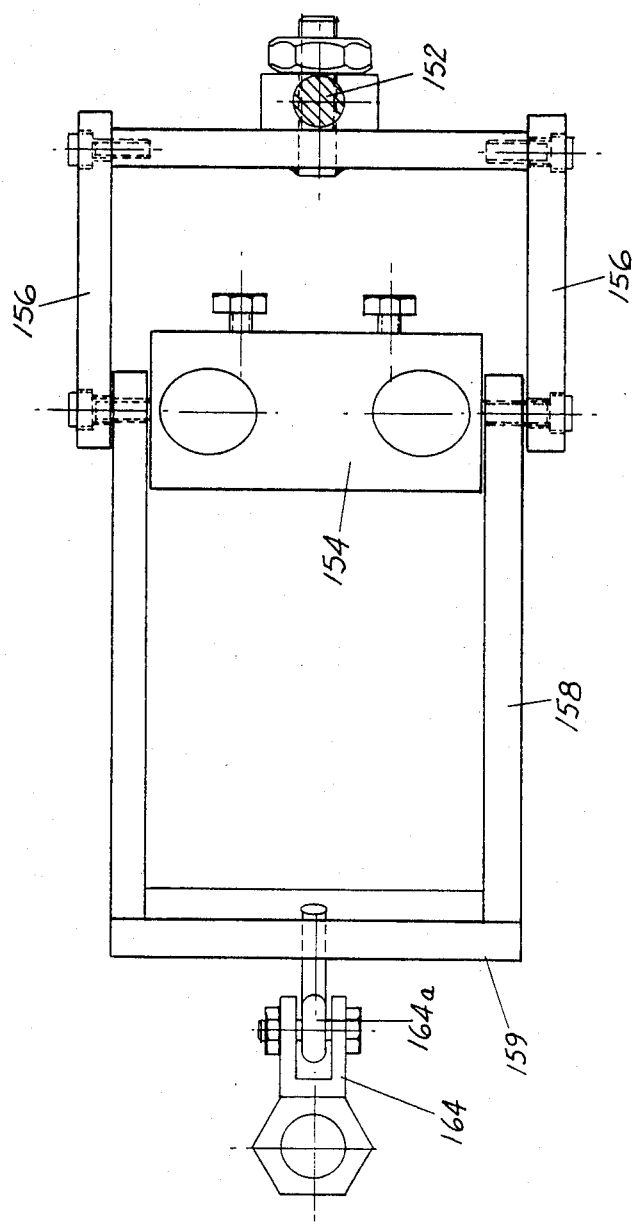
FIG. 10 is a horizontal section along the lines 10—10 of FIG. 9.

In FIGS. 9 and 10, there is shown a detail of the welding head 116 which makes it possible to finely adjust the position of a welding torch in the welding head 116 in use. The flexible cable 113 can be seen in FIG. 9. The flexible drive 113 has an angular end fitted into a correspondingly shaped recess in a shaft 142. The shaft 142 acts through a reduction gear box 144 to reduce backlash of the wire cable 113 on stepping. The gear box 144 in turn has an output shaft 146. As the flexible drive cable 144 is incrementally rotated by the stepping motor 114 so this incremental stepping is transmitted through the shaft 142, the gear box 144 and the shaft 146. This causes a corresponding rotation in a framework comprising an outwardly extending bar 148 on the shaft 146, a laterally extending bar 150 rigidly connected to the bar 148 and an inwardly extending bar 152 rigidly connected to the bar 150.

The bar 152 is pivotally connected to a welding torch holder 154 by a parallelogram linkage 156.

At the other side the welding torch holder 154 is pivotally connected to a pair of plates 158. The plates 158 are rigidly interconnected by a plate 159 remote from the welding torch holder 154. Further, a screw adjuster 160 interconnects the bar 140 through a collar 162 against which it is spring biased. The collar 162 is pivotally attached to the arm 140. The other end of the adjuster 160 is threadedly engaged with a threaded aperture in a linkage 164 connected to the plate 159 and having an intermediate pivot 164a.

Thus, the position of the welding torch in the holder 154 can be varied, if desired, by turning the adjuster 160 to move it in the threaded aperture of the linkage 164. This action moves the adjacent ends of the plates 158 and the parallelogram linkage 156 thus the welding torch either towards or away from the inner wall of the pipe bend 122. As with the embodiment of FIGS. 1 to 4, the weld head 116 can be replaced by equivalent apparatus such as a spray head or a plasma head. Other variations as discussed above in relation to FIGS. 1 to 4 are applicable to the embodiment of FIGS. 6 to 10.

Modifications and variations such as would be apparent to a skilled addressee are deemed within the scope of the present invention.

For example, in the embodiment of FIGS. 1 to 4, the single rail 14 and wheel 24 could be replaced by a double rail and a four wheeled carriage for greater stability. In the embodiment of FIGS. 6 to 8, the wheels 132 could be replaced by a limit switch connected to a motor which in use rotates the shaft 102 to rotate the cradle 100 and give uniform stick out distance between a welding or spray head to the inside wall of a conduit.

I claim:

1. A method of coating an internal wall of a curved conduit which comprises the steps of inserting a guide means in the conduit which guide means extends substantially axially of the conduit, said guide means having a longitudinally flexible member in association with it so as to cause the flexible member to be longitudinally guided by the guide means, connecting a coating member to one end of said flexible member, providing drive means for moving said flexible member and then said coating means relative to and longitudinally of said conduit, causing the coating means to deposit a layer of protective material in a strip extending longitudinally of said conduit and then rotationally incrementally stepping the flexible member and the coating means to an adjacent position and reversing the drive means so as to cause the coating means to deposit a further strip of protective material adjacent the first coated strip.

2. An apparatus for use with a coating means to coat an internal wall of a curved conduit with a layer of protective material, comprising:
means including a longitudinally flexible member which is transversely substantially rigid and guide means for said flexible member;
means for mounting the coating means adjacent a first end of the flexible member, for incremental rotation with the flexible member;
a drive means for driving the flexible member relative to the curved conduit to be coated, so that the coating means can enter the curved conduit and so that the coating means can deposit a strip of protective material longitudinally of the curved conduit; and
stepping means coupled to the flexible member for automatically stepping the flexible member and the coating means by a rotational increment after the coating means has completed a traverse of the conduit.

3. An apparatus according to claim 2 further including means for automatically reversing the drive means so that the apparatus deposits a strip of protective material adjacent each prior protective strip.

4. An apparatus according to claim 2 wherein the flexible member comprises a tube longitudinally about the guide means.

5. An apparatus according to claim 2 wherein said flexible member comprises a cable.

6. An apparatus according to claim 2 wherein said guide means includes a curved portion arranged in use to be located axially of a corresponding curve in the conduit.

7. An apparatus according to claim 2 wherein said drive means comprises: a pinion, a rack arranged to engage drivingly with the pinion, the said driving engagement causing the flexible member to move relative to the guide means to cause the coating means to enter the conduit.

8. An apparatus according to claim 2 wherein said drive means further comprises a wheel affixed to the drive means and a rail running parallel to said guide means wherein the wheel is in engagement with the rail.

9. An apparatus according to claim 2 further including switches adjacent each end of the rack for limiting the degree of traverse of the flexible member on each pass and for causing appropriate signals to be sent to the stepping means and the drive means.

10. An apparatus according to claim 7 further including a crown wheel coupled to said pinion whereby to drivingly engage the pinion and crown rotatably mounted on the guide shaft and fixedly attached to the flexible tube such that when the stepping motor steps through a rotational increment the stepping movement is imported to the coating means.

11. An apparatus according to claim 2 further including a rigid welding arm and wherein the flexible member is mounted inside the rigid guide.

12. An apparatus according to claim 2 wherein the flexible member is connected at one end to the stepping means to rotate incrementally the flexible cable.

13. An apparatus according to claim 12 wherein the rigid welding guide is arcuate in shape.

14. An apparatus according to claim 12 further including a driving shaft and a radial arm and wherein guide means is connected to the drive means by means of the radial arm.

15. An apparatus according to claim 14 further comprising an arcuate pivotally mounted cradle arranged to have mounted thereon a curved conduit to be internally coated.

16. An apparatus according to claim 15 further comprising at least two saddles arranged to support a curved conduit, said saddles being laterally adjustable.

17. An apparatus according to claim 14 further comprising a guide arm and a guide rail following substantially the arcuate shape of the cradle which guide rail is attached to the guide arm arranged to pivot in conjunction with the radial arm.

18. An apparatus according to claim 17 wherein said guide rail includes ends laterally adjustable relative to the cradle to allow for differing shapes in conduits to be coated.

19. An apparatus according to claim 9 wherein the switches are contacted upon displacement by the driving means whereby when the coating means reaches the end of a transverse, said switches send signals for causing the stepping means to rotate the flexible cable by a rotational increment and for reversing the drive means.

20. An apparatus according to claim 2 wherein said coating means comprises a welding head.

* * * * *